United States Patent [19]
Mori et al.

[11] Patent Number: 5,762,423
[45] Date of Patent: Jun. 9, 1998

[54] BEARING DEVICE, SOLID RESIN LUBRICATING COMPOSITION AND POROUS OIL-IMPREGNATED BEARING

[75] Inventors: Natsuhiko Mori, Miegun Mieken; Yasuyuki Watanabe, Kuwana; Yasuhiro Yamamoto, Kuwanashi, all of Japan

[73] Assignee: NTN Corporation, Osaka-fu, Japan

[21] Appl. No.: 679,086

[22] Filed: Jul. 12, 1996

[30] Foreign Application Priority Data

| Jul. 14, 1995 | [JP] | Japan | 7-178804 |
| Apr. 11, 1996 | [JP] | Japan | 8-089760 |
| Apr. 26, 1996 | [JP] | Japan | 8-107873 |
| Apr. 26, 1996 | [JP] | Japan | 8-107879 |

[51] Int. Cl.$^6$ ............ F16C 33/02; F16C 33/16; F16N 1/00
[52] U.S. Cl. .......... 384/279; 384/397; 384/408; 384/412; 384/902
[58] Field of Search ................ 384/279–322, 384/392, 415, 408–409, 410–411, 412–413, 414, 902

[56] References Cited

U.S. PATENT DOCUMENTS

| 3,834,773 | 9/1974 | Anderson, Jr. | 384/412 |
| 4,355,250 | 10/1982 | Langdon | 384/410 |
| 4,599,006 | 7/1986 | Abel | 384/408 |
| 5,490,730 | 2/1996 | Akita et al. | 384/279 |

*Primary Examiner*—Daniel P. Stodola
*Assistant Examiner*—Matthew A. Kaness
*Attorney, Agent, or Firm*—Nikaido Marmelstein Murray & Oram, LLP.

[57] ABSTRACT

A bearing device wherein a porous body is formed with a bearing surface (5a) which comes in slide contact with the slide surface of a shaft (3) to be supported, while a porous oil-impregnated bearing (5) impregnated with a lubricating oil or lubricating grease and a solid resin lubricating composition (7) in the form of a synthetic resin substrate having a lubricating component dispersed and held therein are disposed in contact with each other.

11 Claims, 3 Drawing Sheets

| SOLID RESIN LUBRICATING COMPOSITION | AMOUNT OF RETAINED OIL | | AMOUNT OF OIL-LOSS (mg) |
|---|---|---|---|
| | BEFORE A TEST (mg) | AFTER A TEST (mg) | |
| NO | 29.9 | 21.3 | 8.6 |
| YES | 28.5 | 28.2 | 0.3 |

CONDITION; NUMBER OF REVOLUTION: 11300rpm
　　　　　　ATMOSPHERE: ORDINARY TEMPERATURE AND HUMIDITY
　　　　　　OPERATING HOUR: 100h
　　　　　　DIMENSION OF SPECIMEN: φ4 × φ9 × 3
　　　　　　MATERIAL OF SPECIMEN: COPPER MATERIAL

BEARING DEVICE, SOLID RESIN LUBRICATING COMPOSITION AND POROUS OIL-IMPREGNATED BEARING

BACKGROUND OF THE INVENTION

The present invention relates to a bearing device comprising a porous oil-impregnated bearing in the form of a porous body impregnated with a lubricating oil or lubricating grease, and a solid resin lubricating composition in the form of a synthetic resin substrate having a lubricating component dispersed and held therein.

A porous oil-impregnated bearing in the form of a porous body, such as a sintered alloy, formed with a bearing surface on which the slide surface of a shaft to be supported slides, and impregnated with a lubricating oil (or lubricating grease) is characterized in that the oil held in the pores of the bearing interior effects lubrication as it is circulated between the bearing interior and the bearing clearance by the sucking and stowing actions with attend relative slide movement between the bearing surface and the slide surface of the shaft. However, in the case of a continuous operation in a high temperature environment, inevitably there is more or less amount of oil loss owing to the movement of oil caused by thermal expansion and pressure generation. For example, oil leaking from the end surfaces of the bearing flows out along the housing, oil leaking through the bearing clearance flows out along the shaft, or the like phenomenon occurs. If oil flows out from the bearing interior, air flows into the pores, with the result that air and oil circulate in the mixed state, so that it is expected that the range of oil film formation in the bearing clearance is narrowed.

Particularly, the shaft is often vertically installed and in a device operated at as high as 10,000 rpm or thereabouts, such as a laser beam printer motor, influences of gravity and centrifugal force come into play and downward movement of oil becomes a problem. As shown in FIG. 6(a), oil leaking, for example, from the lower end surface 20a1 of an upper bearing 20a is returned, in part, to the bearing interior by capillary phenomenon, but oil which adheres to the housing flows out downward along the housing. And oil leaking from the bearing clearance is blown off by centrifugal force. Such outflow of oil becomes a problem with the upper one 20a of a pair of vertically spaced bearings 20a, 20b. Further, in a device like a axial flow fan shown in (b) in the same figure, since thrust load is supported by slide movement between the end surface of a bearing 20 and a thrust washer 21, oil which is slung off the rotating washer 21 is liable to flow out of the bearing.

As measures against oil flowing out of the bearing interior, it may be contemplated to provide an oil supplying mechanism. As an oil supplying mechanism, an arrangement is known in which oil-impregnated felt (fibrous oil supplying article) is disposed in contact with the bearing end surface or outer peripheral surface. The arrangement using such felt, however, has the following problems.

(1) Deformation of the felt sometimes results in upsetting the state of contact between the felt and the bearing. Particularly, in the case of a vertical shaft position shown in FIG. 6(a), if deformation of the felt forms a clearance between it and the end surface 20a1 of the upper bearing 20a, the oil supplying mechanism no longer performs its function.

(2) If the felt should come into contact with the shaft, fiber waste will be caught into the bearing clearance, causing troubles, such as Increased torque, torque variation, and increased shaft vibration.

Further, as disclosed in Laid-Open No. 173953/1994 of Japanese patent application, there is an arrangement in which grease is filled between two bearings. However, such arrangement using filled grease has the following problems.

(3) Two steps, one of installing a bearing and the other of filling grease, are required, thus complicating the operation. Further, if grease adheres to the bearing surface, this causes high torque. To avoid this, It is necessary to Insert the shaft into the bearing in advance before filling grease, thus complicating the assembling operation.

(4) Grease is liable to stick to the shaft, causing a torque variation.

SUMMARY OF THE INVENTION

The present invention is intended to provide an arrangement which suppresses the outflow of oil from the bearing interior without causing the troubles pointed out above, and which is capable of effectively supplying oil to the bearing interior.

In the invention, a porous body is formed with a bearing surface which comes in slide contact with the slide surface of a shaft to be supported, while a porous oil-impregnated bearing impregnated with a lubricating oil or lubricating grease and a solid resin lubricating composition in the form of a synthetic resin substrate having a lubricating component dispersed and held therein are disposed in contact with each other.

Further, in the present invention, a porous body is formed with a bearing surface which comes in slide contact with the slide surface of a shaft to be supported, while a porous oil-impregnated bearing impregnated with a lubricating oil or lubricating grease and a solid resin lubricating composition in the form of a synthetic resin substrate having a lubricating component dispersed and held therein are integrated.

Since the solid resin lubricating composition in the invention has a construction in which a lubricating component is dispersed and held in a synthetic resin substrate, it performs the function of a wall against oil tending to leak from the bearing interior to its surface of contact with the resin lubricating composition, thus suppressing outflow of oil. It also functions to absorb and recover the oil leaking out of the bearing clearance. Further, in the case where oil flows out of the bearing interior to leave pores behind, the lubricating component dispersed and held in the resin lubricating composition is supplied to the bearing interior through their contact surfaces by the capillary force of the pores. Thus, the solid resin lubricating composition in the present invention has three functions: (1) oil leakage suppression, (2) oil recovery, and (3) oil supply.

The present invention has the basic concept of disposing said solid resin lubricating composition in contact with the porous oil-impregnated bearing or integrating them together, so as to hold a proper amount of oil in the bearing interior at all times, thereby maintaining the stabilized bearing function and increasing the bearing life. Therefore, the shape, size, material, and manner of contact of the porous oil-impregnated bearing and resin lubricating composition can be suitably determined, selected or changed within the scope of such basic concept in consideration of circumstances (usage, cost, etc.).

To perform said three functions (particularly, (1) oil leakage suppression, (3) oil supply) more effectively, it is desirable that the capillary force of the porous oil-impregnated bearing be greater than the oil absorbing force of resin lubricating composition. The capillary force in this case is obtained by the capillary phenomenon of the pores present in the substrate (porous body) of the porous oil-impregnated bearing.

The substrate of the porous oil-impregnated bearing in the invention is a sintered body having a homogeneous porous structure obtained by subjecting fine particles usually of iron, copper, zinc, and nickel or alloys thereof to treatments such as mixing, compression molding (or foam molding), firing and surface hardening, said substrate generally having a large number of pores (also called fine holes or air holes) of less than 50 µm (mostly less than 10 µm) distributed therein. The shape of the bearing is not particularly limited, and plain bearings, thrust bearings, journal bearing, etc. can be the subject of the present invention so long as they are of the shape having a bearing surface sliding on the slide surface of a shaft to be supported thereby. Further, the porous oil-impregnated bearing of the present invention is not limited to bearings for supporting a rotational element but also is applicable to those for supporting an axial slide element.

It is preferable that the percentage of the area of the pores (opening percentage) be within the range of 2–20%, desirably about 5%. The opening percentage of usual porous oil-impregnated bearings is 10–20%. However, In the case where the shaft vibrated under unbalanced load as in CD-ROM, this opening percentage is too high, resulting in oil escaping into the bearing interior, sometimes failing to provide sufficient lubrication. On the other hand, if the opening percentage is too low, there is the danger of causing shortage of oil supply to the bearing surface. In the present invention, however, oil supplied from the resin lubricating composition to keep the bearing interior filled with oil; therefore, even if the opening percentage is set to the range of 2–10%, there is no danger of causing oil shortage.

The resin lubricating composition in the present invention is not particularly limited so long as it is in the form of a synthetic resin substrate having a lubricating component dispersed and held therein, but it is desirable from the standpoint of attaining the intended object to a solid form of mixture of a lubricating grease or lubricating oil, superhigh molecular weight polyolefin powder.

More particularly, it is possible to use a resin lubricating composition prepared by mixing 5–99% by weight of lubricating grease with 95–1% by weight of powder of superhigh molecular weight polyolefin whose average molecular weight is $1\times10^6$–$5\times10^6$, and dispersing said superhigh molecular weight polyolefin at a temperature above its gelling temperature and below the dripping temperature of said lubricating grease.

Alternatively, it is possible to use a resin lubricating composition prepared by mixing 5–99% by weight of lubricating grease with 95–1% by weight of powder of superhigh molecular weight polyolefin whose average molecular weight is $1\times10^6$–$5\times10^6$, and dispersing said superhigh molecular weight polyolefin at a temperature above its gelling temperature.

Further, 1–50% by weight of seepage suppressing agent may be added to said components. As for the oil seepage suppressing agent, for example, a solid wax may be used.

In the case of an operation under high temperature condition, as the resin lubricating composition in the present invention, use may be made of a solid resin lubricating composition which is prepared by subjecting a modified silicone oil having a reactive organic group and a hardening agent having an organic group reactive with said reactive organic group to polymerization in a lubricating oil or lubricating grease, holding the lubricating oil or lubricating grease in a three-dimensional mesh structure of silicone, said lubricating oil or lubricating grease having no compatibility with said modified silicone oil and said hardening agent.

It is preferable to adjust the components such that the sum of the amounts of said modified silicone oil and said hardening agent is 20–80% by weight to the total weight of said resin lubricating composition, and such that the weight ratio of said modified silicone oil to said hardening agent is 10:1 to 1:10. Further, it is preferable that the functional group equivalent of said modified silicone oil or said hardening agent be 50–5000 g/mol.

It is possible to employ an arrangement in which said modified silicone oil is amino-modified silicone oil and in which said hardening agent is a bisphenol type epoxy compound. Alternatively, it is possible to employ an arrangement in which said modified silicone oil is amino-modified silicone oil and in which said hardening agent is alicyclic epoxy compound.

Further, as the resin lubricating composition in the present invention, use may be made of a solid resin lubricating composition which is prepared by subjecting a modified silicone oil having a reactive organic group and an organic group reactive with said reactive organic group to polymerization In a lubricating oil or lubricating grease, holding the lubricating oil or lubricating grease in a three-dimensional mesh structure of silicone, said lubricating oil or lubricating grease having no compatibility with said modified silicone oil. It is preferable that the functional group equivalent of said modified silicone oil be 50–5000 g/mol.

According to the present Invention, since a porous oil-impregnated bearing and a solid resin lubricating composition are disposed in contact with each other or integrated together, the amount of oil in the porous oil-impregnated bearing is maintained always at the proper value, thereby maintaining the stabilized bearing function for a long time and improving the bearing service life. Furthermore, as compared with the conventional felt, the present device is compact and yet holds much oil per unit area, and has no drawbacks such as fiber waste of felt entering the bearing clearance to cause torque variations. Further, as compared with an arrangement using grease itself, it is solid and hence is easy to handle, and has no danger of grease sticking to the rotating shaft to cause torque variations.

DESCRIPTION OF THE PREFERRED EMBODIMENTS

Embodiments of the invention will now be described.

Figures 1, 2:
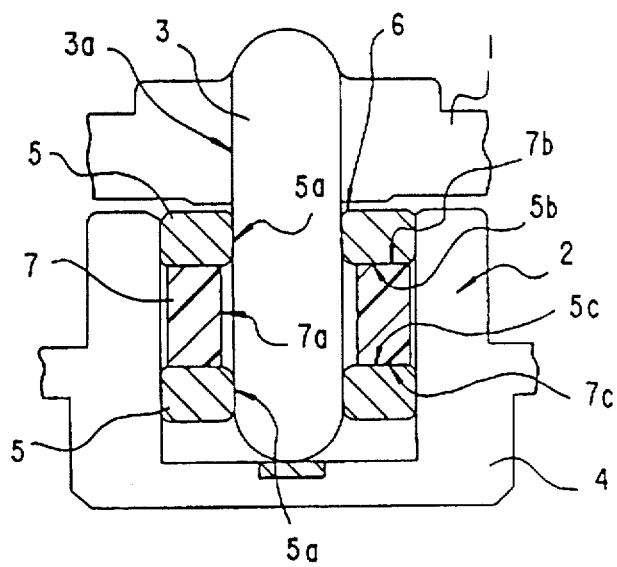
FIG. 1 is a sectional view showing an embodiment of the present invention.
FIG. 2 is a table which shows the results of a comparative test of an embodied article and a conventional bearing.

In a scanner motor for a laser beam printer shown in FIG. 1, a bearing device comprises a porous oil-impregnated bearing 5 having the function of rotatably supporting, with respect to a housing 4, a shaft rotated at high speed by exciting force between a rotor i and a stator 2 and having a bearing surface 5a formed on a porous body (substrate) of sintered alloy or the like and opposed to the outer peripheral surface of a shaft 3 with slight bearing clearance 6 formed therebetween, said bearing being impregnated with a lubricating grease (or lubricating oil), and a solid resin lubricating composition 7 having a lubricating component, e.g., a lubricating oil (or lubricating grease) dispersed therein. In this embodiment, the shaft 3 is in the vertical position, and supported for slide movement by the bearing surfaces 5a of a pair of vertically spaced porous oil-impregnate d bearings 5. The resin lubricating composition 7 is interposed between a pair of porous oil-impregnated bearings 5. The pair of porous oil-impregnated bearings and resin lubricating composition 7 are both annular and their respective vertically opposed end surfaces (the lower end surface 5b of the upper porous oil-impregnated bearing 5 and the upper end surface 7b of the resin lubricating composition 7, and the upper end surface 5c of the lower porous oil-impregnated bearing 5 and the lower end surface 7c of the resin lubricating composition 7) contact each other. In addition, the clearance between the inner peripheral surface 7a of the resin lubricating composition 7 and the outer peripheral surface 3a of the shaft 3 is set at more than twice the size of the bearing clearance. This takes prevention of torque increase into account.

The resin lubricating composition 7 can be produced, for example, by a method comprising the steps of mixing a predetermined amount of lubricating grease or lubricating oil and a predetermined amount of superhigh molecular weight polyolefin homogeneously, pouring the mixture into a mold of predetermined shape, dispersing the superhigh molecular weight polyolefin at or above its gelling temperature or a lubricating grease, if used, at or below its dripping temperature, and allowing the molding to cool at ordinary temperature.

The superhigh molecular weight polyolefin powder used in this embodiment may be a powder of polyethylene, polypropylene, polybudene or a copolymer thereof or a mixture of powders of such materials, the average molecular weight of each powder in this embodiment as measured by viscosity method is $1\times10^6$–$5\times10^6$. Polyolefins within the range of said average molecular weight are superior in rigidity and oil retention to polyolefins of lower molecular weight and rarely flow even if heated to high temperatures. The mixing percentage of such superhigh molecular weight polyolefin is preferably 95–1% by weight to the total weight of the resin lubricating composition (the mixing percentage of lubricating grease or lubricating oil is preferably 5–99% by weight), but it may be suitably adjusted according to the desired degree of oil release property, viscosity and hardness of the resin lubricating composition. The greater the amount of superhigh molecular weight polyolefin, the greater the hardness of the gel after it is dispersed at a predetermined temperature.

The lubricating grease used in this embodiment is not specifically restricted, and as a non-soap-thickened or soap—thickened lubricating grease, mention may be made of such greases as lithium soap—diester type, lithium soap—polyalphaolefin type, lithium soap—dialkyl diphenyl ether type, lithium soap—mineral oil type, sodium soap mineral oil type, aluminum soap—mineral oil type, lithium soap—diester mineral oil type, non-soap—diester type, non-soap—mineral oil type, non-soap—polyol ester type, and lithium soap—polyol ester type. Likewise, the lubricating oil used in this embodiment is not specifically restricted, and mention may be made of such lubricating oils as diester type, mineral oil type, diester mineral oil type, polyol ester type, polyalphaolefin type, and dialkyl diphenyl ether type. In addition, the lubricating grease base oil or lubricating oil Is desirably the same as the lubricating oil with which the porous oil-impregnated bearing is impregnated, but it may be more or less different therefrom so long as it does not detract from the lubricating property.

Though the melting point of said superhigh molecular weight polyolefin cannot definitely be specified, as it differs according to said average molecular weight, the melting point of a superhigh molecular weight polyolefin whose average molecular weight is $2\times10^6$ as measured by viscosity method is 136° C. Commercially available articles having the same molecular weight include Miperon (registered trademark) XM-220 manufactured by Mitsui Petrochemical Industries, Ltd.

To disperse said lubricating grease or lubricating oil as a lubricating component in a substrate (matrix) of superhigh molecular weight polyolefin, this is achieved by mixing said materials, and heating it at or above the temperature at which the superhigh molecular weight polyolefin gels, said temperature being less than the dripping temperature of a lubricating grease, if used, e.g., heating it at 150°–200° C.

Since the resin lubricating composition 7 in this embodiment is of the construction in which the lubricating grease or lubricating oil serving as a lubricating component is dispersed in a superhigh molecular weight polyolefin substrate, it serves as a wall blocking the oil tending to leak especially from the lower end surface 5b of the upper porous oil-impregnated bearing 5 as it flows with the rotation of the shaft, thus suppressing the outflow of oil from the bearing interior. It also serves to absorb and recover the oil leaking from the bearing clearance 6. In the case where oil flows out of the interior of the porous oil-impregnated bearing 5 to leave pores behind, the lubricating component dispersed and held in the resin lubricating composition 7 is supplied to the porous oil-impregnated bearing 5 by the capillary action of the pores via the contact surfaces (5b and 7b, and 5c and 7c). Thus, the resin lubricating composition 7 has the three functions: (1) oil leakage suppression, (2) oil recovery and (3) oil supply. Therefore, the interior of the porous oil-impregnated bearing 5 is kept filled with oil and its good lubricating property is maintained for a long time. Therefore, the porous oil-impregnated bearing 5 in this embodiment performs the excellent bearing lubricating function for a long time and has a long life. Further, unlike the conventional felt, it does not contain fibrous matter, so that there is no danger of fiber or the like entering the bearing clearance, and unlike grease, it is solid, so that it never sticks to the rotating shaft, never forming a cause of torque variation. And since it is solid, it is very easy to handle, leading to an increased efficiency of assembling operation.

In addition, in order to ensure said functions of the resin lubricating composition 7, it is desirable that the capillary force of the porous oil-impregnated bearing 5 be greater than the oil absorbing force of the resin lubricating composition 7. To conceptionally explain this relation between the oil absorbing force and the capillary force, (1) when pores not filled with oil form in the porous oil-impregnated bearing 5, oil is supplied to the porous oil-impregnated bearing 5 from the resin lubricating composition 7, (2) even if the resin lubricating composition 7 does not hold oil to 100% of its capacity, there is no possibility of oil flowing from the porous oil-impregnated bearing 5 to the resin lubricating composition 7, (3) even when the resin lubricating composition 7 is disposed in contact with the lower side of the porous oil-impregnated bearing 5, it can be said that it is preferable to establish a relation which provides said functions, (1) oil leakage suppression and (2) oil recovery.

It is preferable that the percentage of the area of the pores to the total area of the bearing surface 5a be within the range of 2–10%. Preferably, it is about 5%.

Figure 6A:
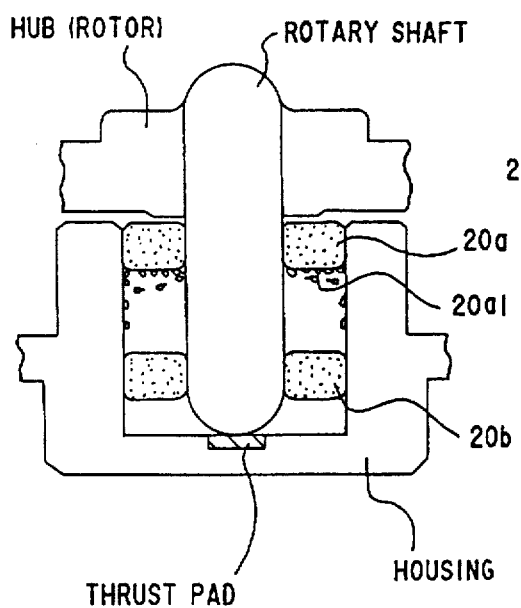
FIGS. 6a and 6b are sectional views of a conventional porous oil-impregnated bearing.
Figure 6B:
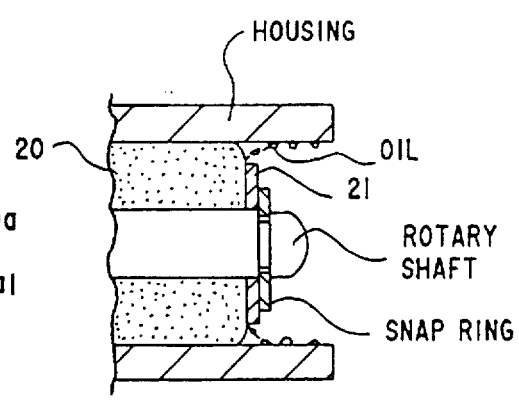

FIG. 2 shows the result of examining the amount of retained oil before and after a test of the upper porous oil-impregnated bearing by using a laser printer motor (FIG. 1) according to this embodiment and a conventional laser printer motor (FIG. 6(a)) not having a solid resin lubricating composition. In the conventional article shown in FIG. 6 (a), about 30% of oil flowed out after 100 h of operation, whereas in the embodied article shown in FIG. 1, there was found no change in the amount of retained oil even after 100 h of operation. It is considered that the retained oil in the porous oil-impregnated bearing 5 was maintained by the three functions of the resin lubricating composition 7 mentioned above.

In the case where it is used in a high temperature atmosphere or where it is used at high speed and involves generation of much heat due to friction, it is expected that the amount of oil seeping from the resin lubricating composition 7 becomes excessively large. In such case, a seepage suppressing agent may be added to the resin lubricating composition 7 to suitably suppress the oil release rate of oil seeping to the contact surfaces 7b, 7c to ensure an appropriate amount of oil supply to the porous oil-impregnated bearing 5. As such seepage suppressing agent, use is made of a wax, such as a solid wax or a composite such as low molecular weight polyolefin containing the same. As for said solid wax, mention may be made of vegetable waxes, such as carnauba wax and candelilla wax, animal waxes, such as bees wax and insect wax, and petroleum type waxes, such as paraffin wax. It is preferable that such seepage suppressing agent be added in an amount of 1–50% by weight with respect to the total weight of the resin lubricating composition 7. The greater the amount, the more effectively the oil release can be suppressed, decreasing the seeping rate. However, if it exceeds 50% by weight, this Is undesirable since the strength of the resin lubricating composition 7 is decreased.

Figure 3:
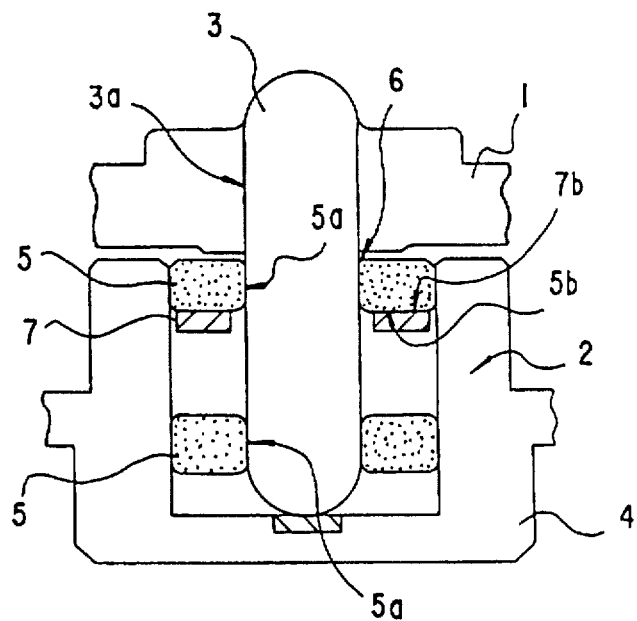
FIG. 3 is a sectional view of another embodiment of the invention.

In an embodiment shown in FIG. 3, the axial length of the solid resin lubricating composition 7 is decreased to bring its upper end surface 7b into contact with the lower end surface 5b alone of the upper porous oil-impregnated bearing 5. This arrangement is a result of taking into consideration of the fact that, as described above, in the case of a vertical shaft, the outflow of oil becomes a problem particularly in the upper porous oil-impregnated bearing 5.

Figure 4A:
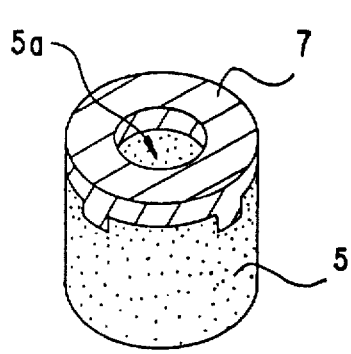
FIGS. 4a–4d are perspective views of another embodiment of the invention.
Figure 4B:
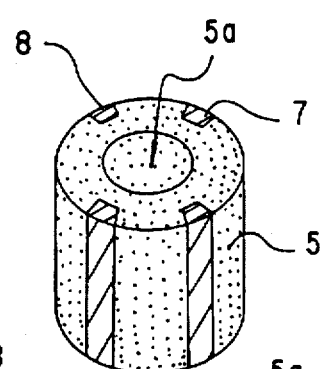
Figure 4C:
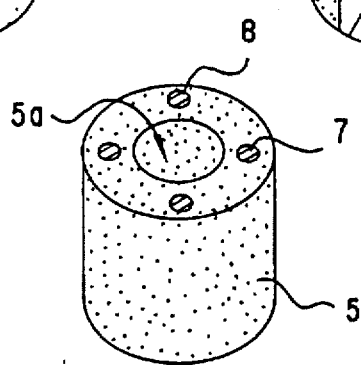
Figure 4D:
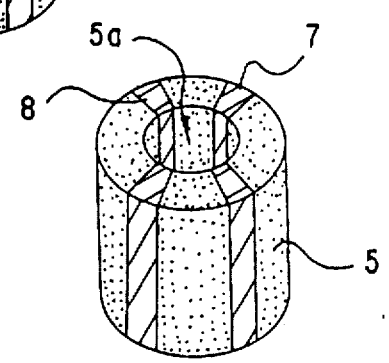

Embodiments shown in FIGS. 4(a)–4(c) each shows an arrangement in which the porous oil-impregnated bearing 5 and the solid resin lubricating composition 7 are integrated. In FIG. 4(a), one end surface of the porous oil-impregnated bearing 5 has a disk-shaped resin lubricating composition 7 fitted thereon in a contact state. In addition, the other end surface also may have a similar resin lubricating composition 7 fitted thereon in a contact state. In FIGS. 4(b)–4(d), the substrate (porous body), or the porous oil-impregnated bearing 5, is formed with filling spaces 8, in each of which the resin lubricating composition 7 is filled and solidified. In FIG. 4(b), axial grooves are formed In the porous body and filled with resin lubricating compositions 7. In FIG. 4 (c), the porous body is formed with axial through-holes, which are filled with resin lubricating compositions 7. In FIG. 4(d), the porous body is radially cut and resin lubricating compositions 7 are fitted in the cut portions. In each of the arrangements shown in FIGS. 4(a)–4(d), since the porous oil-impregnated bearing 5 and the resin lubricating compositions 7 are integrated, the above-described advantages are obtained and at the same time, the assembling of parts into the housing 4 can be effected in the same steps as in the conventional article and the assembling operation can be made efficient.

In addition, in the arrangement shown in FIG. 4(a), since the volume of the resin lubricating composition 7 can be increased, more oil can be held, while in the arrangements shown in FIGS. 4(b)–4(d), the bearing size can be made the same as that of a one-piece bearing, providing an advantage that it can be incorporated into a conventional device without changing its design.

Figure 5:
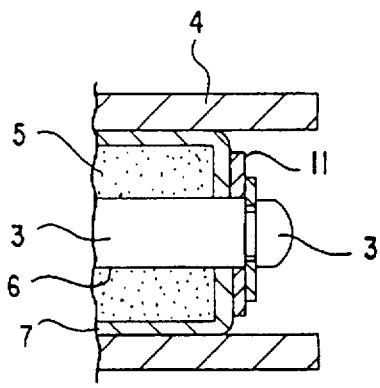
FIG. 5 is a sectional view of another embodiment of the invention.

In an embodiment shown in FIG. 5, a bearing device of unitary type as shown in FIGS. 4(a)–4(d) is applied to a horizontally installed axial fan. The porous oil-impregnated bearing 5 is formed at its outer peripheral surface and end surface with a plurality of groove-like filling spaces, in which resin lubricating compositions 7 are filled. And a thrust washer 11 is disposed in contact with one end surface of the porous oil-impregnated bearing 5.

In the case of an operation under high temperature conditions, instead of providing the resin lubricating compositions 7 described above, modified silicone oil having an reactive organic group and a hardening agent which is reactive with said reactive organic group are subjected to polymerization in a lubricating oil or lubricating grease, said lubricating oil or lubricating grease being retained in a three-dimensional mesh structure of silicone. As said lubricating oil or lubricating grease, use is made of a solid resin lubricating composition employing as said lubricating oil or lubricating grease one which has no compatibility with said modified silicone oil and said hardening agent.

It is preferable that the sum of the amounts of said modified silicone oil and said hardening agent be 20–80% by weight to the total weight of the resin lubricating composition and that the components be adjusted so that the weight ratio of said modified silicone oil to said hardening agent is within the range of 10:1 to 1:10. Further, it is preferable that the equivalent of the functional group in the reactive organic groups of said modified silicone oil or said hardening agent be set at 50–5000 g/mol. An arrangement may be employed in which said modified silicone oil is amino-modified silicone oil and said hardening agent is bisphenol type epoxy compound. Alternatively, there may be employed an arrangement in which said modified silicone oil is amino-modified silicone oil and said hardening agent is an alicyclic epoxy compound.

As for said modified silicone oil, use may be made in non-limiting sense of known modified silicone oils having amino group, epoxy group, hydroxyl group, mercapto group, or caboxyl group bonded to the side chain or terminal end of silicone.

Any combination of said modified silicone oil and the reactive organic group of said hardening agent may be selected so long as mutually reactive organic groups are present therein. If the combination of organic groups is a combination of amino group and epoxy group, not limited to the type in which one of the organic groups is bonded to either the silicone oil or the hardening agent, then examples thereof include two types of combination, a first combination of amino-modified silicone oil and epoxy hardening agent and a second combination of epoxy-modified silicone oil and amino hardening agent. That is, preferable examples of combination of the modified silicone oil and the reactive organic group of the hardening agent include hydroxyl group and isocyanato group, hydroxyl group and carboxyl group, hydroxyl group and epoxy group, amino group and isocyanato group, amino group and carboxyl group, and amino group and epoxy group.

Further, excluding the reactive organic group of modified silicone oil, the rest may be replaced by metal. For example, if metallosiloxane, in which part of silicone is replaced by metal, such as aluminum or titanium, is used, there is obtained a composition which is superior in heat resistance.

As for concrete examples of a compound preferable for use as said hardening agent having epoxy group, mention may be made of bisphenol type epoxy compounds, and alicyclic epoxy compounds. Among bisphenol type epoxy compounds is a reaction product of bisphenol A and epichlorohydrin, and as for commercially available products, mention may be made of "Epycoats 825, 827, 834, 815" produced by Yuka shell Epoxy Co, Ltd. and as for a reaction product of bisphenol F and epychlorohydrin, mention may be made of "Epycoat 8070" produced by Yuka shell Epoxy Co, Ltd.

As for alicyclic epoxy compounds, mention may be made of alicyclic diepoxy acetal (e.g., "CY175" produced by Ciba Geigy Co, Ltd.), alicyclic diepoxy adipate (e.g., "CY177" produced by Ciba Geigy Co, Ltd.), alicyclic diepoxy carboxylate (e.g., "CY179" produced by Ciba Geigy Co, Ltd.), vinyl cyclohexane dioxide, diglycidylphthalate, diglycidyltetrahydrophthalate, diglycidylhexahydrophthalate, dimethyl glycydylphthalate, dimethyl glycydylhexahydrophthalate, dimer acid glycidyl ester, dimer acid glycidyl ester modification, aromatic diglycidyl ester, and cycloaliphatic diglycidyl ester.

Said lubricating oil is one which has no compatibility with silicone, and mention may be made of oils other than silicone oil, such as mineral oil, synthetic diester oil, polyol ester oil, ether oil, fluorine oil, hydrocarbon oil, and phosphoric acid ester oil.

Further, a mixture of two or more of such lubricating oils can be used if It has no compatibility with silicone.

Said lubricating grease Is prepared by adding a thickening agent such as metal soap or non-soap (diurea, bentonite, polyurea, etc.) to said lubricating oil used as a base oil to provide a suitable degree of viscosity and adding, if necessary, various additives such as an extreme-pressure agent. Lubricating greases (thickening agent base— oil) to be used In this embodiment are shown by way of example below.

Lithium soap—diester oil type, lithium soap—mineral oil type, lithium soap—synthetic hydrocarbon type, sodium soap—mineral oil type, aluminum soap—mineral oil type, lithium soap—diester oil type, non-soap—ether oil type, non-soap—synthetic hydrocarbon type, and lithium soap—polyol ester type.

The resin lubricating composition in this embodiment is formed by a three-dimensional mesh structure since it has no compatibility with the lubricating oil or lubricating grease when components including the lubricating oil or lubricating grease are held in three-dimensional mesh form of silicone. The space for holding the lubricating oil or lubricating grease is larger than when there is compatibility between the lubricating oil or lubricating grease and silicone and they form a communicating space. Therefore, it becomes possible for the lubricating oil or lubricating grease held in the interior of the resin lubricating composition to seep out to the composition surface through the communication holes.

In addition, the temperature at which silicone oil is polymerized is less than 180° C., between room temperature and 150° C., having no danger of thermally degrading the resin substrate and lubricating component, the thus produced resin lubricating composition having heat resisting and other preferable physical properties.

Further, a resin lubricating composition is prepared by subjecting a reactive organic group and a modified silicone oil having an organic group reactive with said reactive organic group to polymerization in a lubricating oil or lubricating grease and holding said lubricating oil or lubricating grease in a three-dimensional mesh structure of silicone. It is also possible to use a solid resin lubricating composition employing a lubricating grease or lubricating oil having no compatibility with said modified silicone oil. It is preferable that the functional group equivalent of the reactive organic group of said modified silicone oil be 50–5000 g/mol.

The following components may be added to the solid resin lubricating composition within the range in which they do not impair the objects of the present invention: powders of minerals, such as calcium carbonate, talc, silica, clay, and mica, inorganic fibers, such as glass fiber, asbestos, quartz wool, carbon fiber, and metal fiber, non-woven and woven fabrics made of these materials, organic fibers, such as aromatic polyamide fiber (Aramid fiber), and polyester fiber, or polyethylene, polypropylene, polylimide, and other thermosetting and thermoplastic resins.

In addition, the bearing device of the present invention is widely applicable to various motors used in laser beam printers, axial flow fans, ventilating fans, electric fans, and other electric products and automobile electric parts, and is capable of Increasing their service life.

What is claimed is:

1. A bearing device comprising:
    a porous oil-impregnated bearing formed of a porous body, said porous body impregnated with a lubricating oil or lubricating grease and having a bearing surface being in slide contact with a slide surface of a shaft to be supported thereby;
    a solid resin lubricating composition composed of a synthetic resin material and a lubricating component, said lubricating component being dispersed and held in a matrix of said synthetic resin material, said solid resin lubricating composition being spaced from said shaft, said resin lubricating composition having been produced by mixing said lubricating component and a polyolefin powder, heating the mixture to fuse said polyolefin, and curing the fusion to solidify;
    said porous oil-impregnated bearing and said solid resin lubricating composition being in contact with each other.

2. A bearing device comprising:
    a porous oil-impregnated bearing formed of a porous body, said porous body impregnated with a lubricating oil or lubricating grease and having a bearing surface being in slide contact with a slide surface of a shaft to be supported thereby;
    a solid resin lubricating composition composed of a synthetic resin material and a lubricating component, said lubricating component being dispersed and held in a matrix of said synthetic resin material, said solid resin lubricating composition being spaced from said shaft, said resin lubricating composition having been produced by mixing said lubricating component and a polyolefin powder, heating the mixture to fuse said polyolefin, and curing the fusion to solidify;

said porous oil-impregnated bearing and said solid resin lubricating composition being integrally coupled with each other.

3. A bearing device as set forth in claim 1 or 2, wherein said porous oil-impregnated bearing has a capillary force and said resin lubricating composition has an oil absorbing force, said capillary force being greater than said oil absorbing force.

4. A bearing device as set forth in claim 1 or 2, wherein said resin lubricating composition is prepared by mixing 5–99% by weight of lubricating grease with 95–1% by weight of powder of polyolefin whose average molecular weight is $1 \times 10^6 - 5 \times 10^6$, and dispersing said polyolefin at a temperature above its gelling temperature and below the dripping temperature of said lubricating grease.

5. A bearing device as set forth in claim 4, wherein said resin lubricating composition is prepared by mixing 5–99% by weight of lubricating grease with 95–1% by weight of powder of polyolefin whose average molecular weight is $1 \times 10^6 - 5 \times 10^6$, adding 1–50% by weight of an oil seepage suppressing agent, and dispersing said polyolefin at a temperature above its gelling temperature and below the dripping temperature of said lubricating grease.

6. A bearing device as set forth in claim 5, wherein the oil seepage suppressing agent is a solid wax.

7. A bearing device as set forth in claim 1 or 2, wherein said resin lubricating composition is prepared by mixing 5–99% by weight of lubricating oil with 95–1% by weight of powder of polyolefin whose average molecular weight is $1 \times 10^6 - 5 \times 10^6$, and dispersing said polyolefin at a temperature above its gelling temperature.

8. A bearing device as set forth in claim 7, wherein said resin lubricating composition is prepared by mixing 5–99% by weight of lubricating oil with 95–1% by weight of powder of polyolefin whose average molecular weight is $1 \times 10^6 - 5 \times 10^6$, adding 1–50% by weight of an oil seepage suppressing agent, and dispersing said polyolefin at a temperature above its gelling temperature.

9. A bearing device as set forth in claim 8, wherein the oil seepage suppressing agent is a solid wax.

10. A bearing device comprising:

a porous oil-impregnated bearing formed of a porous body, said porous body impregnated with a lubricating oil or lubricating grease and having a bearing surface being in slide contact with a slide surface of a shaft to be supported thereby;

a solid resin lubricating composition composed of a synthetic resin material and a lubricating component, said lubricating component being dispersed and held in a matrix of said synthetic resin material, said solid resin lubricating composition being spaced from said shaft, said resin lubricating composition being produced by subjecting a modified silicone oil having a reactive organic group and a hardening agent having an organic group reactive with said reactive organic group to polymerization in a lubricating oil or lubricating grease to hold said lubricating oil or grease in a three-dimensional mesh structure of silicone, said lubricating oil or grease having no compatibility with said modified silicone oil and said hardening agent;

said porous oil-impregnated bearing and said solid resin lubricating composition being in contact with each other.

11. A bearing device comprising:

a porous oil-impregnated bearing formed of a porous body, said porous body impregnated with a lubricating oil or lubricating grease and having a bearing surface being in slide contact with a slide surface of a shaft to be supported thereby;

a solid resin lubricating composition composed of a synthetic resin material and a lubricating component, said lubricating component being dispersed and held in a matrix of said synthetic resin material, said solid resin lubricating composition being spaced from said shaft, said resin lubricating composition being produced by subjecting a reactive organic group and a modified silicone oil having an organic group reactive with said reactive organic group to polymerization in a lubricating oil or grease to hold said lubricating oil or grease in a three-dimensional mesh structure of silicone, said lubricating oil or grease having no compatibility with said modified silicone oil;

said porous oil-impregnated bearing and said solid resin lubricating composition being in contact with each other.

* * * * *